(12) United States Patent
Kim

(10) Patent No.: US 7,076,901 B2
(45) Date of Patent: Jul. 18, 2006

(54) EMPTY CARTRIDGE REMOVING DEVICE OF A DUMMY LAUNCHER FOR ANIMAL TRAINING

(75) Inventor: Joon S. Kim, Dallas, TX (US)

(73) Assignee: D.T. Systems, Inc., Dallas, TX (US)

( * ) Notice: Subject to any disclaimer, the term of this patent is extended or adjusted under 35 U.S.C. 154(b) by 102 days.

(21) Appl. No.: 10/923,240

(22) Filed: Aug. 20, 2004

(65) Prior Publication Data

US 2005/0132630 A1    Jun. 23, 2005

(51) Int. Cl.
    *F41A 15/00* (2006.01)
(52) U.S. Cl. ............... 42/25; 42/106; 42/46; 42/47
(58) Field of Classification Search ............ 42/106, 42/25, 46, 47, 48
    See application file for complete search history.

(56) References Cited

U.S. PATENT DOCUMENTS

| | | | | |
|---|---|---|---|---|
| 2,711,041 A | * | 6/1955 | Harvey | 42/25 |
| 3,696,542 A | * | 10/1972 | Ekfeldt et al. | 42/16 |
| 3,715,825 A | * | 2/1973 | Ilmonen | 42/47 |
| 3,967,404 A | * | 7/1976 | Reynolds | 42/25 |
| 4,341,030 A | * | 7/1982 | Little | 42/105 |
| 5,109,621 A | * | 5/1992 | Blaser | 42/46 |
| 5,363,580 A | * | 11/1994 | Nishigawa | 42/48 |
| 5,829,180 A | * | 11/1998 | Leiter | 42/77 |

\* cited by examiner

*Primary Examiner*—Michael J. Carone
*Assistant Examiner*—Stewart Knox
(74) *Attorney, Agent, or Firm*—Garlick Harrison & Markison, LLP; James A. Harrison

(57) ABSTRACT

An empty cartridge removing device of a dummy launcher for animal training having a fixed member of a fixed assembly pivotally assembled with a body of a firing assembly, the empty cartridge removing device comprising: a barrel adapted to be coupled with a coupling hole of the fixed member of the fixed assembly and having a guide projection extended therefrom, and an empty cartridge removing assembly for mating with the guide projection of the barrel therein such that a blank cartridge is partially setback from the end of the coupling hole of the barrel. When the cartridge is fired, the cartridge expands to the inside diameter of the coupling hole and the empty cartridge removing assembly. With the empty cartridge partially setback, the mechanical advantage of the empty cartridge removing assembly allows the empty cartridge to be easily removed from the dummy launcher.

4 Claims, 5 Drawing Sheets

EMPTY CARTRIDGE REMOVING DEVICE OF A DUMMY LAUNCHER FOR ANIMAL TRAINING

CROSS REFERENCE TO RELATED PATENTS

This application claims priority to Korean Patent Application Serial No. 20-20036037251, filed Dec. 1, 2003, which is incorporated herein by reference in its entirety for all purposes.

BACKGROUND OF THE INVENTION

1. Technical Field of the Invention

The present invention relates to animal training, and more particularly, to an empty cartridge removing device of a dummy launcher for animal training.

2. Description of Related Art

Hunting is actively pursued by millions of Americans every year. Recent government data shows that more than 14 million people actively hunt a variety of game animals and spend more than 20 billion dollars. There are over three million migratory bird (duck, geese, dove) hunters who collectively spend approximately 1.3 billion dollars on equipment, ammunition, decoys, and other hunting-related expenses of which more than 120 million dollars is spent on hunting dogs as well as associated expenses.

Migratory bird hunters are often assigned a daily quota. The quota is designed, in part, to ensure a species is not over hunted, thus helping to maintain future populations. A hunter, therefore, is interested in retrieving every downed bird. Consequently, many migratory bird hunters use dogs to retrieve downed birds on both land and water. Before dogs can be used to retrieve the bird, they must be trained to locate and return the bird when so commanded. The dog must be conditioned to ignore the explosive report of the muzzle blast and to wait for the hunter's command to retrieve the game. The large caliber shotguns normally used in hunting migratory birds have loud muzzle blasts that, without training, distracts the dog. The dog could be trained during actual hunting but this creates a potentially dangerous environment for the dog when other hunters are in the area. A safe way to train the dog is through simulated hunting wherein a device is used to create a loud noise while simultaneously throwing a dummy for retrieval. To meet this need, dummy launching devices were conceived to reproduce the muzzle blast and to propel a dummy device for retrieval.

FIGS. 1 and 2 illustrate the construction of a conventional dummy launcher. As shown, the conventional dummy launcher is provided with a firing assembly 100 and a fixed assembly 200. In the structure of the firing assembly 100, a body 110 is tapered from a larger upper portion thereof to a smaller lower portion thereof, the body 110 having a fixed piece 111 on the top end thereof, a housing 112 inside of the body 110 and a groove 114 formed on the interior surface of the lower end thereof, and a locking projection 113 formed by the groove 114. A mounting hole 115 is provided to be passed through the top portion of the housing 112, and a support protrusion 116 is disposed on the top surface of the body 110, having a support groove 116a formed at the lower portion thereof. At one side of the support protrusion 116, a support piece 117 through which a support aperture 117a is provided, and at the other side thereof, a fixed groove 118 is formed inside the fixed piece 111. A firing pin 120 is mounted into the housing 112 in such a manner as to protrude through the mounting hole 115. Firing pin 120 has a fixed plate 121 formed thereon and a spring 130 mounted into the housing 112 for elastically supporting the firing pin 120. A support plate 140 is provided to house the end portion of the firing pin 120 in the housing 112 in such a manner as to come in close contact with the locking projection 113 for securing the spring 130 to the body 110. A locking ring 150 is mounted in the groove 114 of the body 110 for securing the support plate 140. A rubber plate 160 is adapted to come in close contact with the bottom surface of the body 110 in such a manner as to absorb the impact of the lower end of the firing pin 120. A pulling member 170 is adapted to receive the lower end of firing pin 120 protruding from the lower portion of the rubber plate 160 therein, and having an O-ring 180 for rigidly fixing the lower end of firing pin 120 to pulling member 170.

The structure of the fixed assembly 200 includes a fixed member 210, a barrel 220, and a locking arm 230. Fixed member 210 is formed with a coupling hole 211 threaded internally to receive a threaded portion of barrel 220. Barrel 220 has a passageway 221 passed through the interior thereof, and a rubber ring 222 formed at the outer end of barrel 220. A housing groove 212 is formed around the interior of fixed member 210 to couple with support protrusion 116 on body 110. A first fixed pin 240 is passed through first fixed aperture 213 and support aperture 117a to moveably attach fixed member 210 to body 110.

Locking arm 230 is moveably attached to fixed member 210 by a second fixed pin 250 inserted into second fixed aperture 214 and rotary hole 231. In the conventional dummy launcher for animal training, when the blank cartridge is fired it expands, under pressure, to the inside diameter of the coupling hole of the barrel forming a very tight compression fitting, and typically requires the use of separate tools to remove the blank cartridge. Using such a tool may be cumbersome and may cause difficulties if the tool is lost while out in a field launching dummies. What is needed, therefore, is a dummy launcher that facilitates removing the blank cartridge casing.

BRIEF SUMMARY OF THE INVENTION

Accordingly, the present invention substantially solves these problems and more by providing a dummy launcher with structural elements for removing an empty cartridge. More specifically, the present invention provides for an empty cartridge removing mechanism of a dummy launcher used for animal training that can prevent an empty cartridge from moving into a coupling hole when a blank cartridge is fired and that can remove the empty cartridge from the coupling hole in an easy and convenient manner.

Accordingly, the present invention provides an empty cartridge removing device of the dummy launcher for animal training having a fixed member of a fixed assembly pivotably assembled with a body of a firing assembly. The dummy launcher comprises a barrel adapted to be coupled with a coupling hole of the fixed member of the fixed assembly and having a guide projection extended therefrom. An empty cartridge removing assembly mates with the guide projection of the barrel such that an empty cartridge is partially setback from the coupling hole, thus facilitating the removal of the cartridge from the coupling hole of the barrel when the empty cartridge removing assembly is rotated therefrom.

The above-referenced description of the summary of the invention captures some, but not all, of the various aspects of the present invention. The claims are directed to some of the various other embodiments of the subject matter towards which the present invention is directed. In addition, other aspects, advantages and novel features of the invention will become apparent from the following detailed description of the invention when considered in conjunction with the accompanying drawings.

BRIEF DESCRIPTION OF THE SEVERAL VIEWS OF THE DRAWINGS

The above description, together with other objects, features and advantages of the present invention will be apparent from the following detailed description of the preferred embodiments of the invention in conjunction with the accompanying drawings, in which.

DETAILED DESCRIPTION OF THE INVENTION

Reference will now be made in detail to the preferred embodiments of the present invention, examples of which are illustrated in the accompanying drawings.

Figure 1:
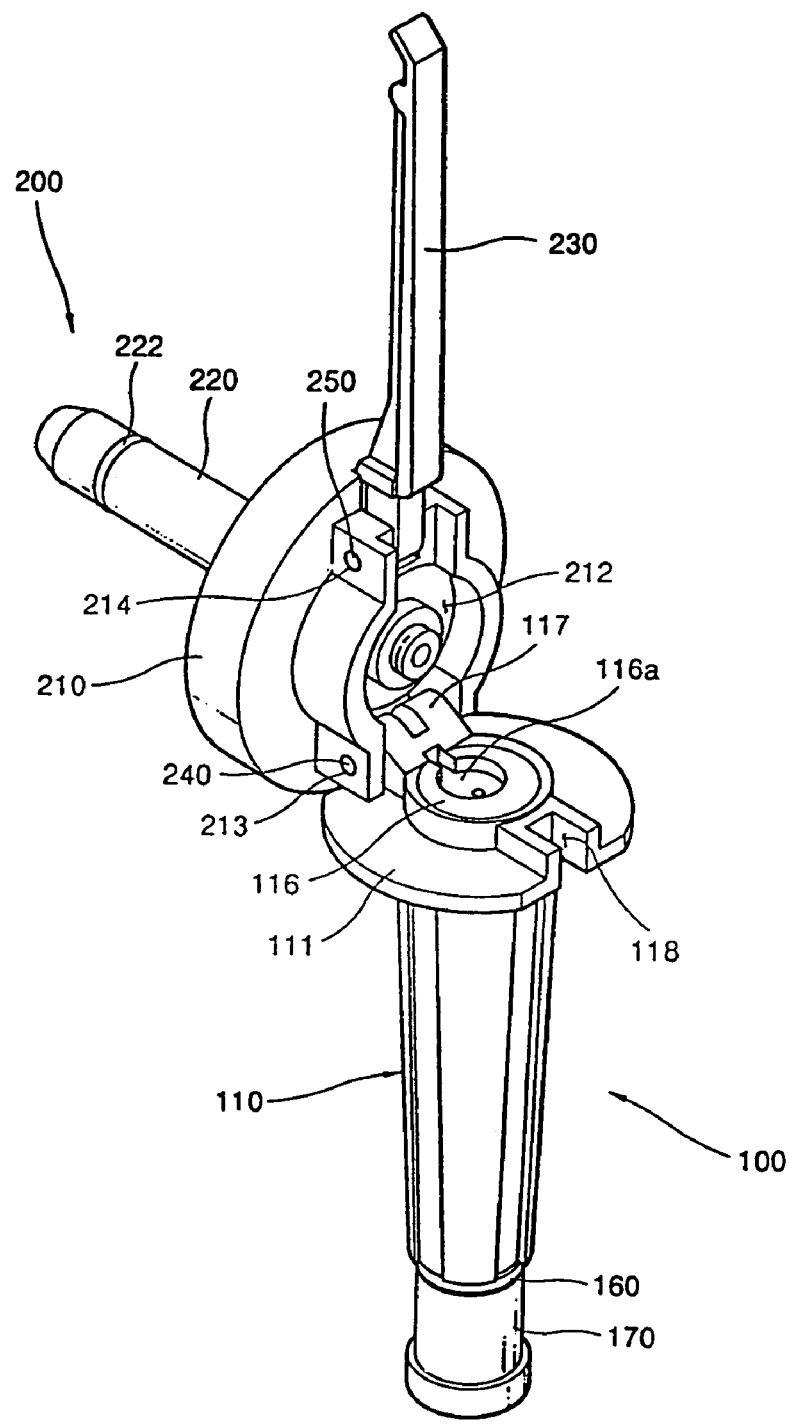
FIG. 1 is a perspective view of a conventional dummy launcher for animal training.
Figure 2:
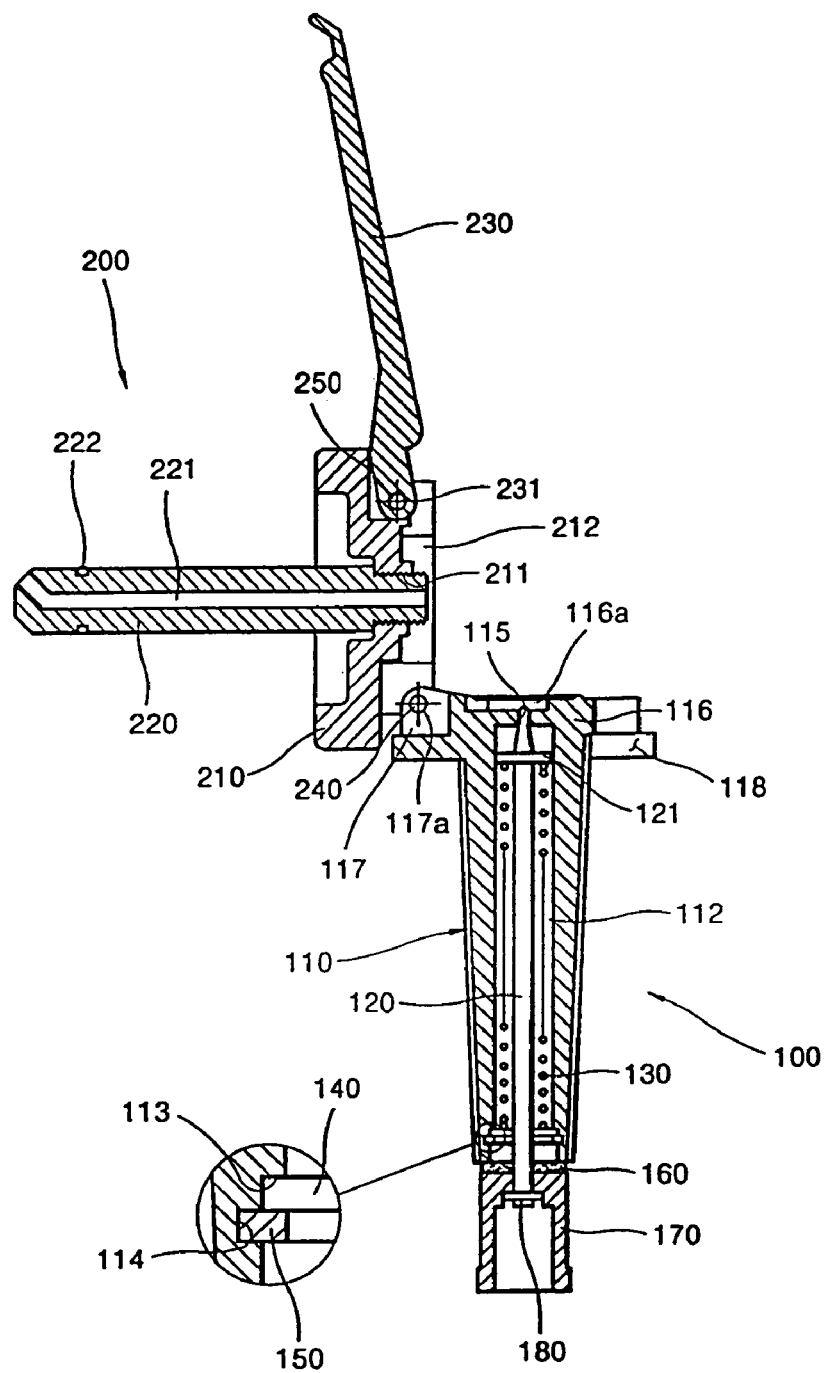
FIG. 2 is a sectional view of the dummy launcher of FIG. 1.
Figure 3:
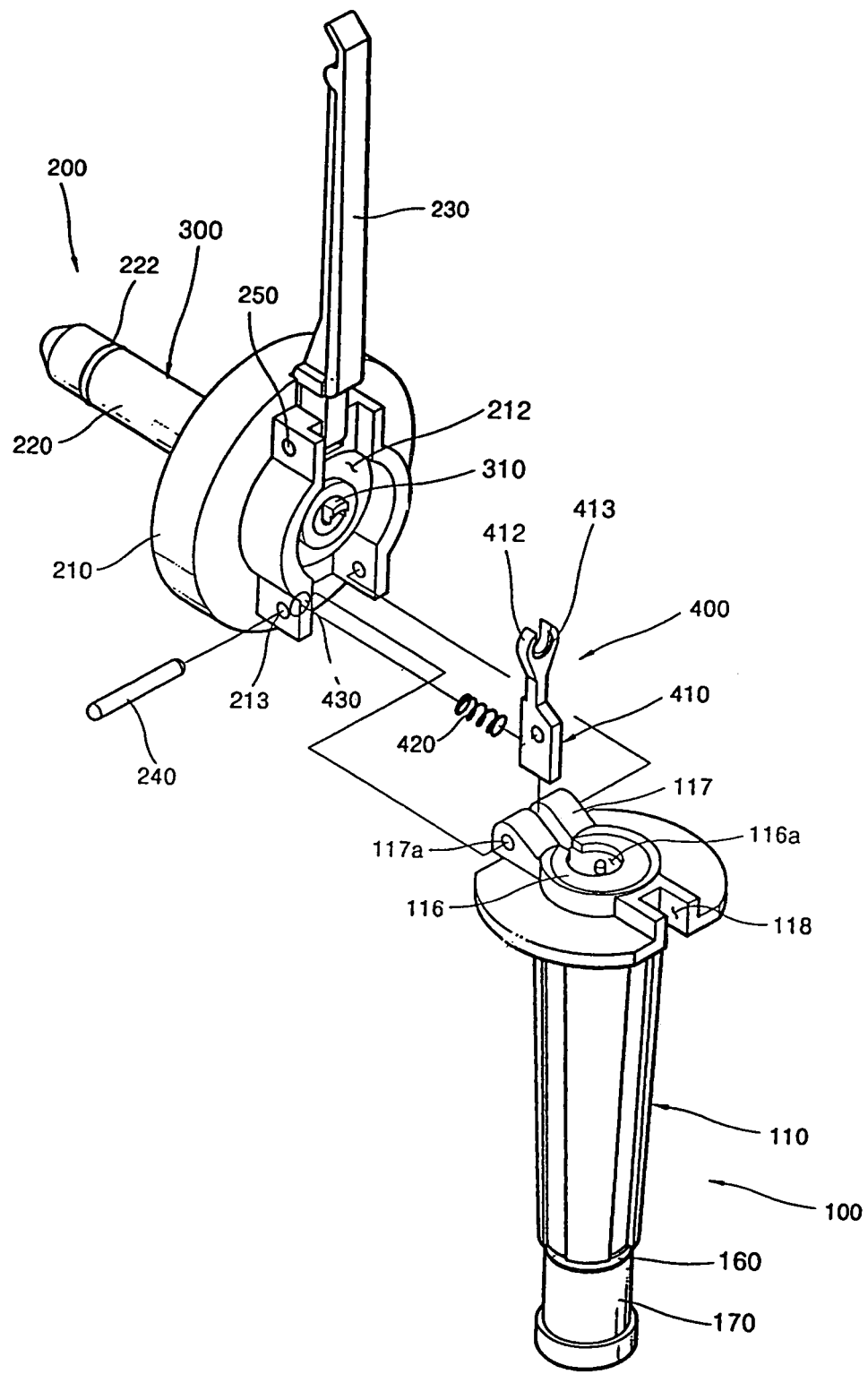
FIG. 3 is a perspective view of a dummy launcher for animal training according to the present invention.

FIG. 3 is a perspective view of a dummy launcher for animal training according to the described embodiment of the invention. A dummy launcher for animal training includes a fixed member 210 of a fixed assembly 200 pivotally assembled with a body 110 of a firing assembly 100, and an empty cartridge removing assembly 400. The empty cartridge removing assembly 400 includes an empty cartridge removing piece 410, a guide member 412, a mounting groove 413, and a spring 420.

The fixed assembly 200 includes a barrel 300 threaded into fixed member 210. A guide projection 310 formed on the end of barrel 300 extends from housing groove 212 and mates with empty cartridge removing piece 410 such that a blank cartridge (blank cartridge "C" of FIG. 5) is partially setback from the housing groove 212.

The empty cartridge removing piece 410 is formed with guide member 412 and mounting groove 413. Guide member 412 and mounting groove 413 are formed to partially encircle a blank cartridge such that the rim of the blank cartridge fits within mounting groove 413 and is flush with a top surface of guide member 412. Guide projection 310 mates with guide member 412 to substantially encircle the blank cartridge and hold the blank cartridge partially setback from housing groove 212 to facilitate removal of the cartridge after firing.

Figure 4:
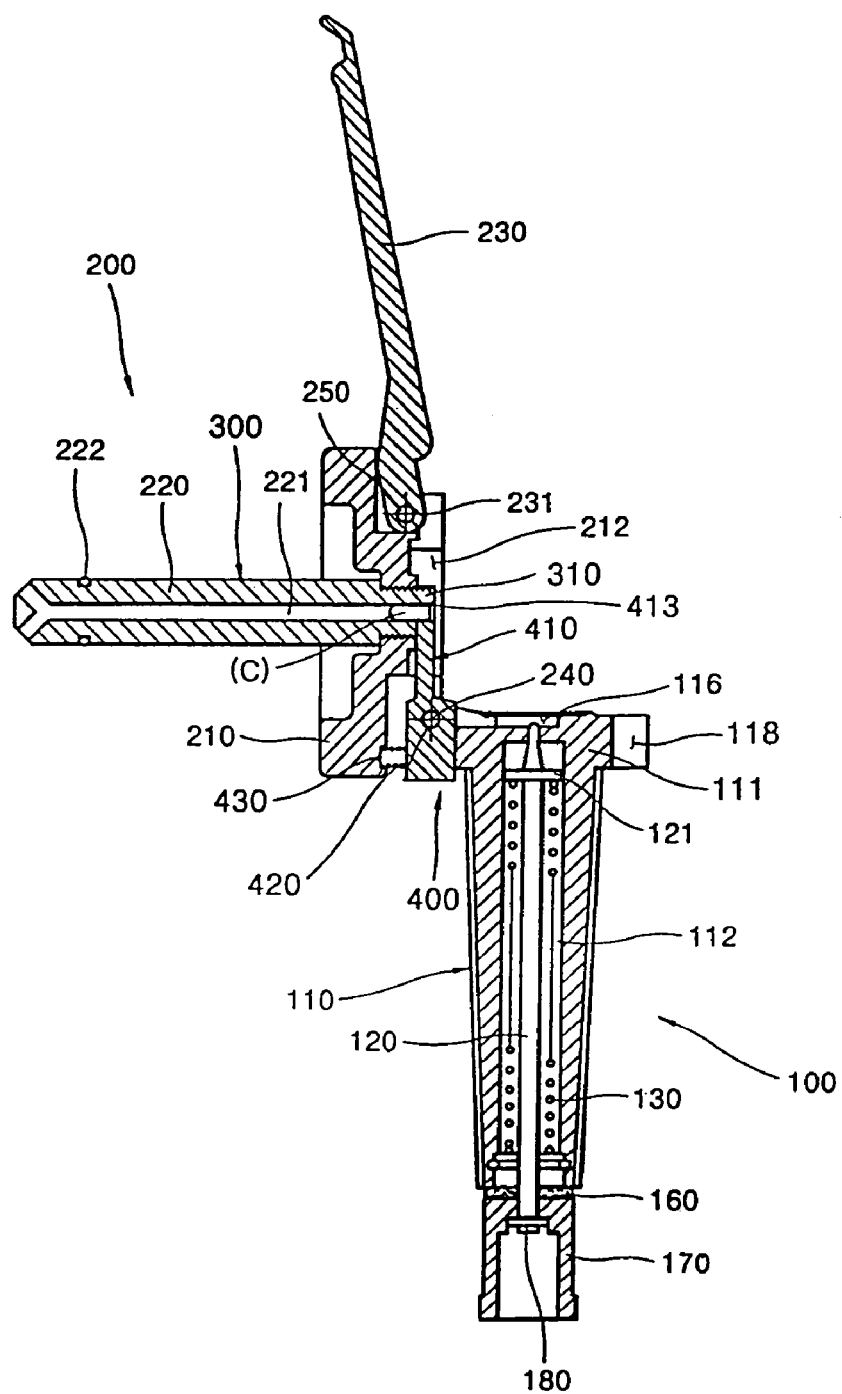
FIG. 4 is a sectional view of the dummy launcher of FIG. 3.

FIG. 4 is a sectional view of the dummy launcher of FIG. 3. Fixed assembly 200 is rotated counterclockwise so that housing groove 212 is perpendicular to fixed groove 118. Mounting groove 413 of empty cartridge removing piece 410 is fully mated with guide projection 310 of fixed assembly 200. In this position, empty cartridge removing piece 410 is held in close contact with fixed piece 111 by spring 420. The blank cartridge "C" is inserted into the aperture formed by guide projection 310 and guide member 412. After the blank cartridge is inserted, locking arm 230 is rotated clockwise until housing groove 212 is in close contact with support protrusion 116. At this point the dummy launcher is ready for firing.

Figure 5:
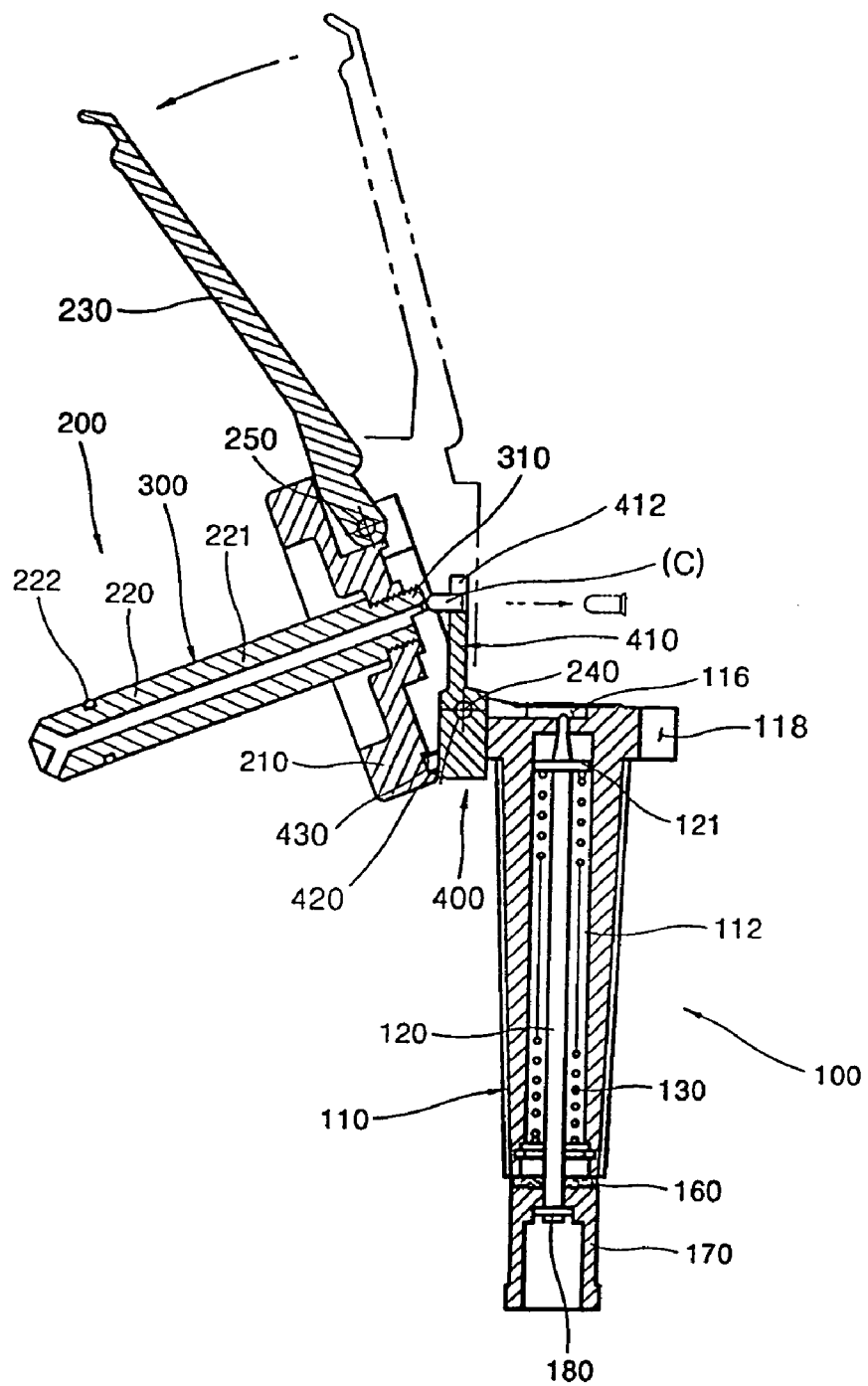
FIG. 5 is a sectional view of the present invention illustrating the ejection of a fired cartridge.

FIG. 5 is a sectional view of the present invention illustrating the ejection of a fired cartridge. After the blank cartridge is fired, locking arm 230 is rotated counterclockwise from fixed groove 118 until housing groove 212 is perpendicular to fixed groove 118. At this point, empty cartridge removing assembly 400 is in close contact with fixed assembly 200. Additional counterclockwise rotation of locking arm 230 causes fixed assembly 200 to pivot away from empty cartridge removing assembly 400. Fired blank cartridge "C" is held securely by guide member 412 so the pivoting motion of fixed assembly 100 separates the fired blank cartridge "C" from passage way 221 of fixed assembly 200. At this point fired blank cartridge "C" may be easily removed by hand. The restoring force of spring 420 returns fixed assembly 200 into close contact with empty cartridge removing assembly 400.

In operation, a dummy is mounted on barrel 300 and a blank cartridge is inserted into an annulus formed by guide projection 310 and mounting groove 413 of the empty cartridge removing piece 410. Fixed member 210 is rotated inwardly around the first fixed pin 240 until the housing groove 212 of the fixed member 210 receives the outer peripheral surface of the support protrusion 116 in such a manner as to come in close contact with the top surface of the fixed piece 111. The locking arm 230 is rotated into the fixed groove 118 of the body 110. When the locking arm 230 is mounted in the fixed groove 118 of body 110, the firing assembly 100 is taken by one hand of a user and pulling member 170 is pulled by the other hand of the user. The pulling force on pulling member 170 compresses the spring 130. When the pulling force applied to the pulling member 170 is released, the compression force of spring 130 propels the end portion of firing pin 120 through mounting hole 115 sufficient to strike the primer of the blank cartridge mounted in barrel 300 such that the cartridge fires, thereby launching the dummy mounted on the barrel 300.

After the dummy is launched, locking arm 230 is rotated around the second fixed pin 250 away from the fixed groove 118 of the body 110. At the same time, the fixed member 210 is rotated outwardly around the first fixed pin 240 such that the spring 420 mounted into the receiving groove 430 of the fixed member 210 is compressed against the lower end of the empty cartridge removing piece 410. When the fixed member 210 is rotated perpendicularly to the fixed piece 111, the locking arm 230 is rotated counterclockwise around the first fixed pin 240.

At this time, the empty cartridge removing piece 410 is depressed on one side by spring 420 and is locked at the other side thereof to the interior of the support piece 117. As locking arm 230 is rotated counterclockwise, the fixed member 210 continues to rotate counterclockwise with locking arm 230, compressing spring 420 such that the guide projection 310 of the barrel 300 is rotated away from the empty cartridge removing piece 410. The fired blank cartridge "C" being held securely by mounting groove 413 of the empty cartridge removing piece 410 separates from guide projection 310 and passage way 221 of barrel 300. At this time fired blank cartridge "C" is simply removed by hand from the mounting groove 413.

As described above, a dummy launcher for animal training having a empty cartridge removing assembly provides for easy and convenient removal of empty cartridges by hand without the need for additional tools.

The invention disclosed herein is susceptible to various modifications and alternative forms. Specific embodiments therefore have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims.

What is claimed is:

1. A dummy launcher for animal training, comprising:
   a firing assembly for firing a blank cartridge;
   a fixed assembly pivotally coupled to the firing assembly for receiving the blank cartridge and for receiving a launching dummy, the fixed assembly comprising:
   a fixed member;
   a barrel for directing hot gases from a fired cartridge to the launching dummy;
   a guide projection;
   a locking arm for locking the fixed assembly to the firing assembly; and
   an empty cartridge removing assembly for removing the fired blank cartridge, comprising:
   an empty cartridge removing piece moveably attached to the firing assembly;
   a spring coupled to an edge of the empty cartridge removing piece and to a receiving groove in the fixed assembly;
   an annular shaped guide member, formed at one end of the empty cartridge removing piece and formed with an opening on one side, wherein the opening mates with the guide projection;
   a mounting groove formed on the inner peripheral surface of the guide member to engage a substantial portion of a rim of the blank cartridge; and
   a rotary hole that aligns with a support aperture of the firing assembly to moveably couple the empty cartridge removing piece to the firing assembly.

2. The dummy launcher of claim 1, wherein:
   the annular-shaped guide member holds a portion of the blank cartridge setback from an end of the barrel, wherein the setback portion facilitates removal of the fired blank cartridge.

3. The dummy launcher of claim 1, wherein the spring comprises sufficient restoring force to maintain the empty cartridge removing assembly in close contact with the fixed assembly to maintain the blank cartridge in the setback position.

4. A dummy launcher, comprising:
   an empty cartridge removing assembly, comprising:
   an empty cartridge removing piece, including:
   an annular shaped guide member formed at one end of the empty cartridge removing piece and formed with an opening on one side; wherein the opening mates with a barrel projection;
   a mounting groove formed on the inner peripheral surface of the guide member to engage a substantial portion of the rim of a blank cartridge; and
   wherein the annular shaped guide member, when mated with the barrel projection, maintains the blank cartridge in a setback position from the barrel to facilitate removal of a fired cartridge; and
   a return mechanism coupled to an edge of the fired blank cartridge, wherein the return mechanism returns the empty cartridge removing piece to a static position after the fired blank cartridge is removed.

* * * * *